United States Patent
Hayes et al.

(10) Patent No.: US 11,097,857 B2
(45) Date of Patent: Aug. 24, 2021

(54) MULTIPLE CORE MOTOR CONTROLLER PROCESSOR WITH EMBEDDED PROGNOSTIC/DIAGNOSTIC CAPABILITIES

(71) Applicant: Hamilton Sundstrand Corporation, Charlotte, NC (US)

(72) Inventors: Tyler W. Hayes, Rockford, IL (US); Jeffery S. Schmidt, Rockton, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 334 days.

(21) Appl. No.: 16/205,304

(22) Filed: Nov. 30, 2018

(65) Prior Publication Data
US 2020/0172268 A1 Jun. 4, 2020

(51) Int. Cl.
| | |
|---|---|
| B64F 5/60 | (2017.01) |
| G07C 5/00 | (2006.01) |
| G07C 5/08 | (2006.01) |
| B64D 45/00 | (2006.01) |

(52) U.S. Cl.
CPC ............... B64F 5/60 (2017.01); B64D 45/00 (2013.01); G07C 5/006 (2013.01); G07C 5/085 (2013.01); G07C 5/0808 (2013.01); B64D 2045/0085 (2013.01)

(58) Field of Classification Search
CPC ......... B64F 5/60; G07C 5/006; G07C 5/0808; G07C 5/085; G05B 19/0421; B64D 45/00; B64D 2045/0085
See application file for complete search history.

(56) References Cited

U.S. PATENT DOCUMENTS

| | | | |
|---|---|---|---|
| 9,678,488 B1 | 6/2017 | Dhondt et al. | |
| 9,703,595 B2 * | 7/2017 | Whitfield | G06F 9/4843 |
| 2008/0147571 A1 * | 6/2008 | Greiner | G06Q 30/0283 705/400 |
| 2013/0046509 A1 * | 2/2013 | Dhanekula | G06F 11/24 702/186 |
| 2013/0274962 A1 * | 10/2013 | Cornell | B64D 43/00 701/3 |
| 2014/0303832 A1 * | 10/2014 | Skertic | B64D 45/00 701/29.6 |

(Continued)

FOREIGN PATENT DOCUMENTS

DE 102014019531 A1 6/2016

OTHER PUBLICATIONS

Huyck "ARINC 653 and multi-core microprocessors—Considerations and potential impacts" 2012 IEEE/AIAA 31st Digital Avionics Systems Conference (DASC). IEEE, (Oct. 2012) pp. 1-7.

(Continued)

*Primary Examiner* — Russell Frejd
(74) *Attorney, Agent, or Firm* — Cantor Colburn LLP

(57) ABSTRACT

An aircraft includes an electrical system and an electronic controller in signal communication with the electrical system. The electronic controller including a main processor and a multi-core processor. The multi-core processor includes one or more control cores and one or more prognostic cores. The control core is in signal communication with the electrical system to control power delivered thereto. The prognostics core is configured to process prognostics and diagnostics data of the electrical system independently from operation of the control core.

20 Claims, 3 Drawing Sheets

(56) References Cited

U.S. PATENT DOCUMENTS

2017/0147008 A1    5/2017   Mere et al.
2017/0256957 A1    9/2017   Buiel et al.
2020/0172261 A1*   6/2020   Hayes .................... B64D 45/00

OTHER PUBLICATIONS

Search Report for European Application No. 19208650.2; Application Filing Date Nov. 12, 2019; dated Apr. 14, 2020 (9 pages).

* cited by examiner

MULTIPLE CORE MOTOR CONTROLLER PROCESSOR WITH EMBEDDED PROGNOSTIC/DIAGNOSTIC CAPABILITIES

BACKGROUND

The teachings described herein relate generally to aircraft systems, and more particularly, to aircraft electronic controllers.

Aircraft motor systems typically include a motor controller to control motor systems in the aircraft. A conventional motor controller is implemented as a single core processor that executed logic for delivering power from a first primary distribution bus to a starter-generator to initiate a starting procedure for the aircraft. The motor controller may also provide AC power to additional AC motors.

BRIEF DESCRIPTION

According to a non-limiting embodiment, an aircraft includes an electrical system and an electronic controller in signal communication with the electrical system. The electronic controller including a main processor and a multi-core processor. The multi-core processor includes one or more control cores and one or more prognostic cores. The control core is in signal communication with the electrical system to control power delivered thereto. The prognostics core is configured to process prognostics and diagnostics data of the electrical system independently from operation of the control core.

According to another non-limiting embodiment, an electronic aircraft controller is configured to control an electrical system of an aircraft. The aircraft controller comprises a multicore processor including at least one control core and at least one prognostics core. The at least one control core is configured to generate a power control signal to control the electrical system. The at least one prognostics core is configured to process and analyze prognostics and diagnostics data of the electrical system independently from operation of the control core.

According to yet another non-limiting embodiment, a method to control an electrical system installed in an aircraft comprises outputting, via at least one control core included in a multi-core processor, power signals to operate the electrical system, and returning operating data from the electrical system to the at least one control core. The method further includes processing, via a prognostics core included in the multi-core processor, the operating data independently from operation of the control core, and generating prognostics and diagnostics data of the electrical system based on the operating data independently from operation of the control core.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
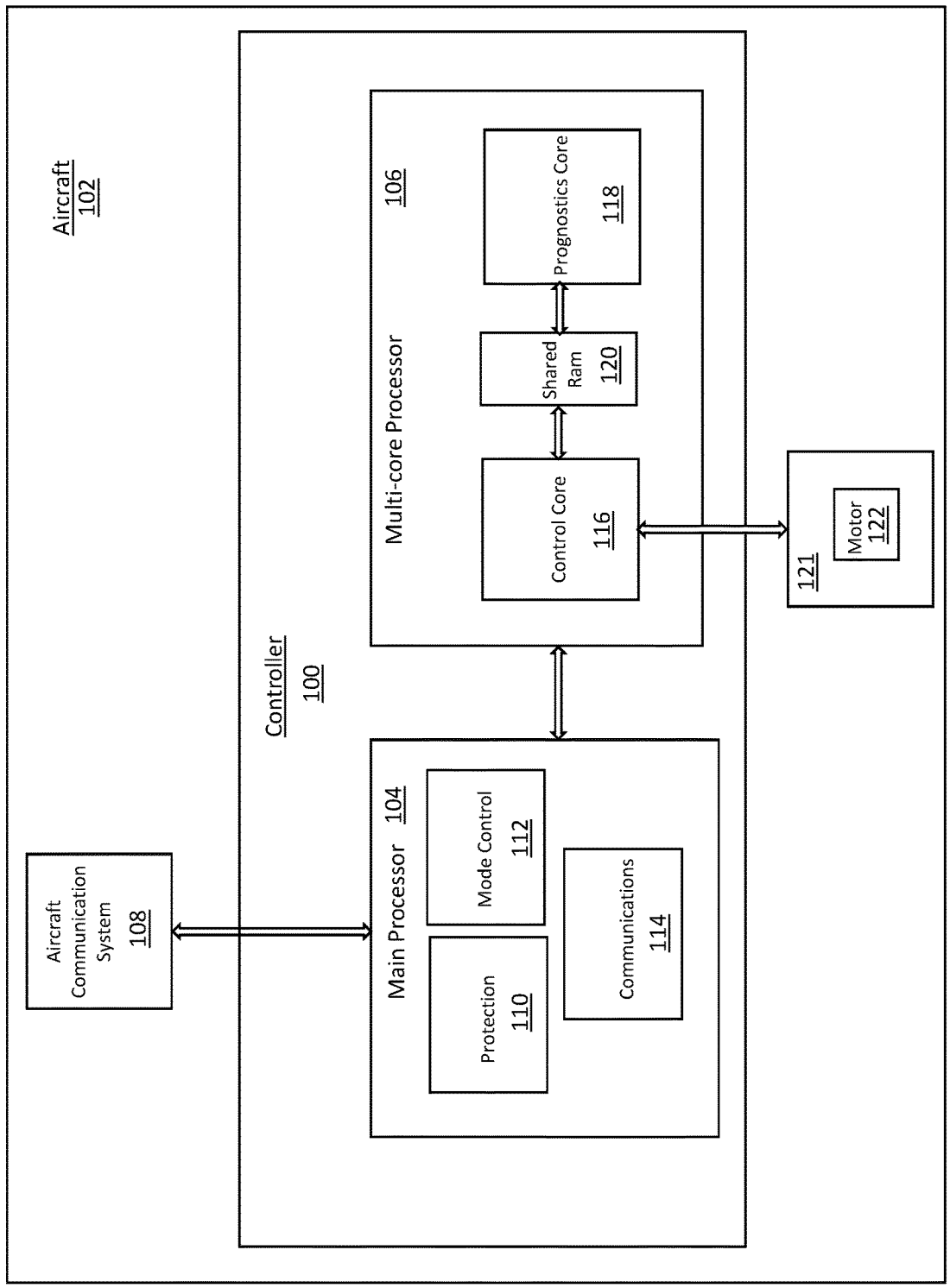
FIG. 1 is a block diagram illustrating an aircraft controller including a multi-core motor controller processor according to a non-limiting embodiment.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

As used herein, the term "module" refers to an application specific integrated circuit (ASIC), an electronic circuit, a microprocessor, a computer processor (shared, dedicated, or group) and memory that executes one or more software or firmware programs, a combinational logic circuit, a microcontroller including various inputs and outputs, and/or other suitable components that provide the described functionality. The module is configured to execute various algorithms, transforms, and/or logical processes to generate one or more signals of controlling a component or system. When implemented in software, a module can be embodied in memory as a non-transitory machine-readable storage medium readable by a processing circuit (e.g., a microprocessor) and storing instructions for execution by the processing circuit for performing a method. A controller refers to an electronic hardware controller including a storage unit capable of storing algorithms, logic or computer executable instruction, and that contains the circuitry necessary to interpret and execute instructions.

Turning now to a description of technologies that are more relevant to the present teachings, the single core processor of a conventional motor controller is capable of handling motor and power inverter controls. The motor controller single core processor, however, cannot sufficiently process additional data types such as, for example, prognostics and diagnostics data. Consequently, conventional motor systems are incapable of incorporating prognostics and diagnostics data analysis schemes to perform maintenance and health predictions to potentially mitigate or eliminate faults before they occur.

Various non-limiting embodiments described herein provide a multi-core motor controller processor configured to perform prognostic/diagnostic data processing and analysis. The multi-core motor controller processor includes multiple cores capable of performing power management and delivery for motor control and power inversion, while also performing prognostic/diagnostic data processing and analysis to perform maintenance and health predictions to potentially mitigate or eliminate faults before they occur. The added prognostic/diagnostic core can be partitioned from the motor/inverter control core to avoid the need to employ a separate additional power supply, thereby avoiding introduction of failure points and power signal noise into the prognostic/diagnostic data signals. The partition also prevents any unintended interactions with the motor control software in the power/inverter core.

In at least one embodiment, one or more of the added cores can be selectively deactivated when a design scheme does not require a dedicated core. Accordingly, a common core of included in the multi-core motor controller processor can still be used across multiple systems or platforms. The multi-core controller processor described herein can be sized the same as the previous single core processor (i.e., have the same size die) while requiring the same core voltage as the originally considered processor. Accordingly, the need for a separate processor and power supply can be avoided.

With reference now to FIG. 1, an electronic aircraft controller 100 installed on an aircraft 102 is illustrated according to a non-limiting embodiment. The aircraft controller 100 includes a main processor 104 in signal communication with a multi-core processor 106.

The main processor 104 is in signal communication with an aircraft communication system 108 to receive operational commands from the aircraft system. The operation commands include, but are not limited to, motor control commands, software download enable commands, power commands. Electrical operational information such as, for example voltages, current, speed/frequency, protection status from the electrical system 121 can be returned to the aircraft system 102.

The main processor 104 includes a protection unit 110, a mode unit 112, and a communications unit 114. Any one of the protection unit 110, mode unit 112, and communications unit 114 can be constructed as an electronic hardware controller that includes memory and a processor configured to execute algorithms and computer-readable program instructions stored in the memory.

The protection unit 110 is configured to employ various protection measures. The protection measures aim to protect various systems of the aircraft including, but not limited to motor system, power generation systems, power distribution system, and motor controller LRUs. Some examples would be over/under/unbalanced current protection, over/under voltage protection, over/under speed protection, over frequency protection, and over temperature protection. The protection operation can include, for example, disconnecting components or shutting down sub-systems when an over/under protection event is detected.

The mode unit 112 is configured to invoke different modes of the electrical system 121. In the example of a motor system, the mode unit 112 can invoke different operating modes of one or more motors 122. In some instances, different motors may operate according to different operational logic and protections. For example, the mode controller 112 can invoke one mode to operate a permanent magnet motor, and invoke another mode to operate an induction motor.

The communications unit 114 is configured to facilitate inter-processor communication on the aircraft 102. In at least one embodiment, the communications unit 114 can facilitate data exchange between the aircraft 102 and the multi-core processor.

The multi-core motor processor 106 includes one or more control cores 116, one or more prognostics cores 118, and one or more shared memory units 120. The control core 116 is in signal communication with an electrical system 121 to control power delivered thereto. The electrical system 121 includes, but is not limited to, a motor system including one or more motors 122, a power generator system, and a power distribution system. The control core 116 and the prognostic core 118 can each be constructed as an independent processing unit referred to as "a core", which is capable of reading and executing program instructions. The program instructions include various central processing unit (CPU) instructions including, but not limited to, add instructions, data move instructions, and branch instructions.

The control core 116 generates controls signals that control operation of a power inverter circuit (not shown), for example, which drives a motor 122. Although one motor 122 is illustrated, the control core 116 and/or power inverter circuit can drive several different motors. The control core 116 can performs the actual control of different motors based on current, voltage, or speed and receives run, stop, and/or protection commands from the main processor 104. In at least one embodiment, the control core(s) 116 and its operations can be assigned a higher priority level than the prognostic core(s) 118.

The prognostics core 118 is configured to generate prognostics and diagnostics data of the electrical system 121, e.g., the motor 122. In one or more embodiments, the electrical system operating data includes, for example, voltage data, current data, load data, torque data, temperature data, and frequency data. Data can be passed from the main processor 104 to the prognostics core 118. Data can also be passed from the control core 116 to the prognostics core 118. The prognostics core 118 is configured to process the obtained data into prognostics and diagnostics data, which has format that can be used by a health management system (not shown).

In one or more embodiments, each prognostics core 118 is partitioned (i.e., in space and time) from the control core(s) 116. The partitioning refers to partitioning the prognostics core 118 in space and time from the control core 116. In other words, the prognostics core 118 is partitioned in space such that no other partition can change this partition's memory or affect its allocated time to execute. Accordingly, a separate additional power supply in not required to power the prognostic core(s) 118 thereby avoiding introduction of failure points and power signal noise into the prognostic/diagnostic data signals. The partition also prevents any unintended interactions with the motor control software installed the control core 116. Accordingly, the prognostic core 118 can operate while the aircraft is in-flight to obtain motor operational data and perform prognostic/diagnostic processing and analysis without seizing any cycles from the control core or interrupting the higher priority processing operations (e.g., motor control operations) of the control core 116. For example, the prognostics core 118 will be prevented from operating the motor 122, while the control core 116 can operate entirely independent of the prognostics core 118. In at least one embodiment, the control core 116 is also capable of enabling/disabling the prognostics core 118, while the prognostics core 118 is prevented from interrupting the control core 116 and/or the main processor operation 104.

Figure 2:
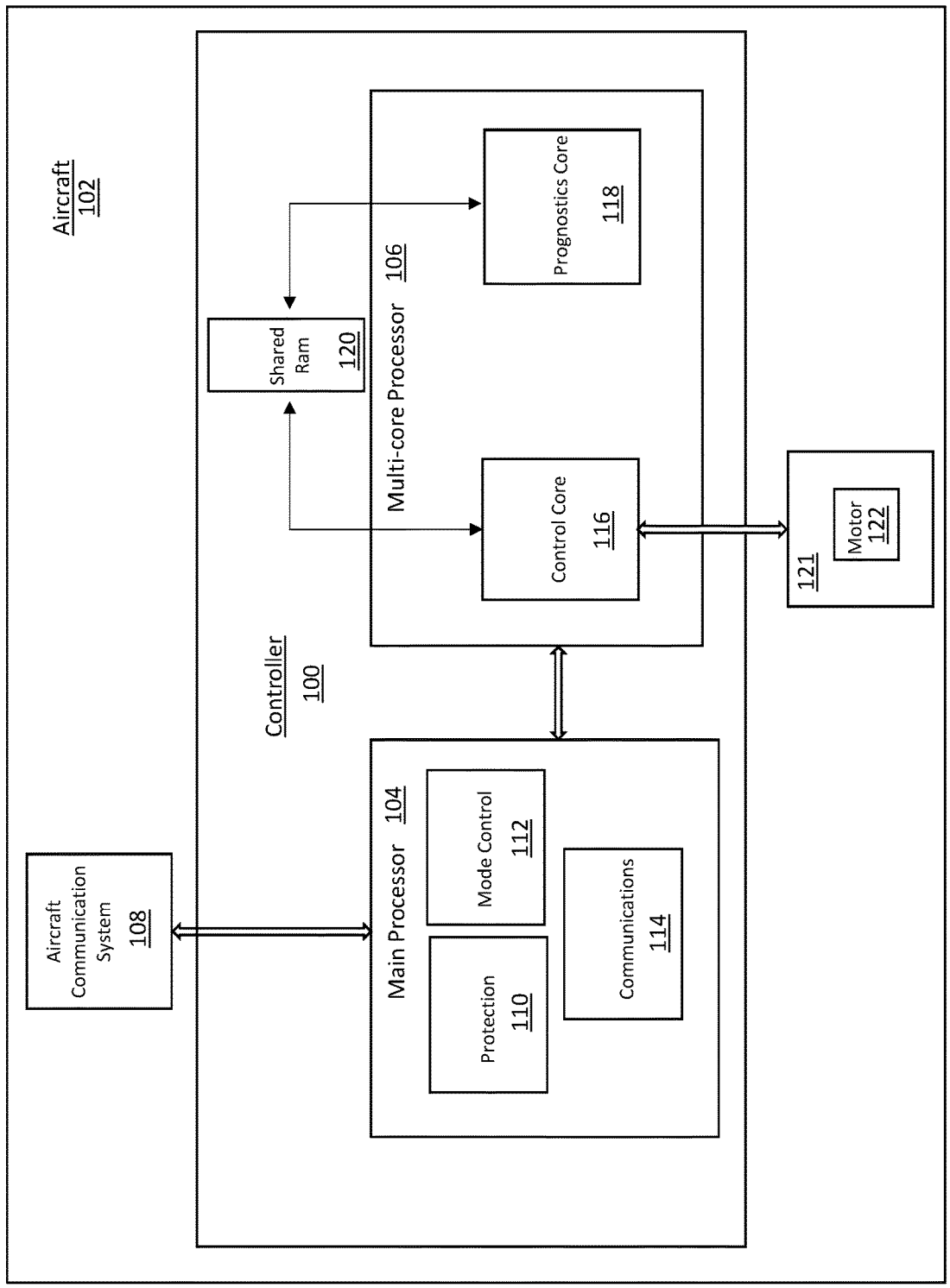
FIG. 2 is a block diagram illustrating an electronic aircraft controller including a multi-core motor controller processor according to another non-limiting embodiment.

The shared memory unit 120 is in signal communication with both the control core 116 and the prognostics core 118. In one or more embodiments, the control core 116 is configured to obtain operating data during operation of the motor 122 and store the operating data in the shared memory unit 120. The prognostics core 118 is configured to obtain the operating data from the shared memory unit 120, and process and analyze the operating data to perform maintenance and health predictions of the motor 122. In some embodiments, the shared memory unit 120 can be integrated with multi-core processor 106) (e.g., installed within the multi-core processor 106) as illustrated in FIG. 1. In other embodiments, the shared memory unit 120 can be installed externally from the multi-core processor 106 as illustrated in FIG. 2. In some embodiments, a plurality of shared memory units 120 can be employed when a plurality of control cores 116 are included in the multi-core processor 106. In this scenario, some shared memory units 120 can be integrated in some control cores 116, while other shared memory units 120 are installed externally from both the control core 116 and the prognostics core 118.

Figure 3:
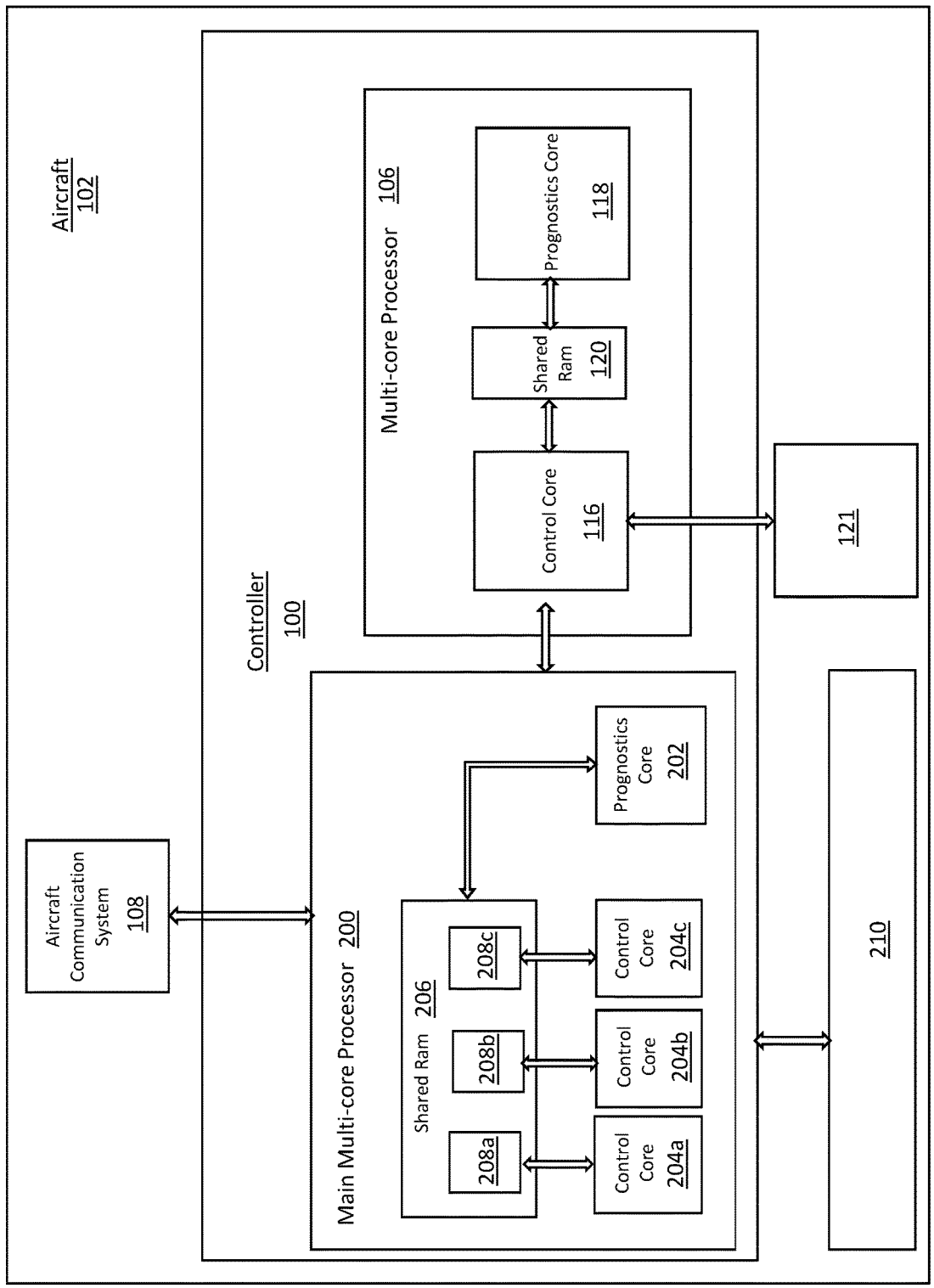
FIG. 3 is a block diagram of a multi-core processor included in an aircraft controller according to a non-limiting embodiment.

Turning to FIG. 3, the aircraft controller 100 is illustrated according to another non-limiting embodiment. The aircraft controller 100 includes a multi-core processor 106 and a main multi-core processor 200. The multi-core processor 106 is in signal communication with an electrical system 121. The multi-core processor 106 operates in a similar manner as described in detail herein, and therefore will not be repeated for the sake of brevity. In this example, the electrical system 121 is constructed as a power distribution system or a power generator system, but is not limited thereto.

The main multi-core processor 200 includes a prognostics core 202, a plurality of control cores 204a, 204b and 204c, and a shared memory unit 206. Although a total of four cores 202, 204a, 204b and 204c are shown, the main multi-core processor 200 can have additional cores (e.g., 8 total cores) without departing from the scope of the invention.

The main multi-core processor 200 can control operation of low-power components 210. These low-power components 210 include, but are not limited to, relays, contact switches, light indicators, lamps, etc. The control cores 204a, 204b, 204c can be dedicated to a separate system. For instance, control core 204a can control operating modes of the electrical system 121, while control cores 204b controls circuit protections. In at least one embodiment, each of the control cores 204a, 204b and 204c stores the operating data in a designated memory location 208a, 208b, 208c assigned to a respective core 204a, 204b, 204c.

The prognostics core 202 can receive a configuration signal (not shown) indicating one or more of the designated memory location 208a, 208b, 208c are to be accessed for obtaining the operating data used to perform the prognostics and diagnostics data processing and analysis. In at least one embodiment, the configuration signal is delivered to the prognostics core 202 upon each startup of the system, and directs the prognostics core 202 to one or more of the designated memory location 208a, 208b, 208c for obtaining the operating data during the flight of the aircraft 102.

As described herein, various embodiments provide a multi-core processor that includes one or more control cores capable of high-priority power control such as, for example, power inversion and motor control, while a separately partitioned prognostics core performs lower-priority prognostic/diagnostic data processing and analysis. The partitioning of the prognostics core prevents any unintended interactions with the control core software, and also avoids cycle usage and interruption of the control core, thereby allowing the prognostics core to operate while the aircraft is operating in-flight.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft comprising:
   an electrical system installed on the aircraft;
   an electronic controller in signal communication with the electrical system, the electronic controller including a main processor and a multi-core processor, the multi-core processor including at least one control core in signal communication with the electrical system to control power delivered thereto, and at least one prognostics core configured to process and analyze prognostics and diagnostics data of the electrical system independently from operation of the control core,
   wherein the at least one control core and its control of power delivery to the electrical system is assigned a higher priority level than the at least one prognostics core and its operation to process and analyze the prognostics and diagnostics data of the electrical system, and
   wherein the at least one control core is configured to enable and disable the at least one prognostics core, while the at least one prognostics core is prevented from interrupting one or both of the at least one control core and the main processor.

2. The aircraft of claim 1, wherein the at least one prognostics core is partitioned from the at least one control core and performs processing and analysis of the prognostics and diagnostics data without using processing cycles of the control core.

3. The aircraft of claim 2, wherein the electronic controller further includes a shared memory unit in signal communication with the at least one control core and the at least one prognostics core.

4. The aircraft of claim 3, wherein the at least one control core is configured to store operating data obtained during operation of the electrical system in the shared memory unit, and the at least one prognostics core is configured to obtain the operating data from the shared memory unit, and process and analyze the operating data to perform maintenance and health predictions of the electrical system.

5. The aircraft of claim 2, wherein the at least one prognostics core performs the processing and analysis of the prognostics and diagnostics data during in-flight operation of the aircraft.

6. The aircraft of claim 1, wherein the electrical system is a motor system including at least one motor.

7. The aircraft of claim 1, wherein the electrical system includes one or both of a power distribution system and a power generator system.

8. An electronic aircraft controller configured to control an electrical system of an aircraft, the aircraft controller comprising:
   a multicore processor comprising:
   at least one control core configured to generate a power control signal to control the electrical system; and
   at least one prognostics core configured to process and analyze prognostics and diagnostics data of the electrical system independently from operation of the control core,
   wherein the at least one control core and its generation of the power control signal to control the electrical system is assigned a higher priority level than the at least one prognostics core and its operation to process and analyze the prognostics and diagnostics data of the electrical system, and wherein the at least one control core is configured to enable and disable the at least one prognostics core, while the at least one prognostics core is prevented from interrupting one or both of the at least one control core and the main processor.

9. The aircraft controller of claim 8, wherein the at least one prognostics core is partitioned from the at least one control core and performs processing and analysis of the prognostics and diagnostics data without using processing cycles of the control core.

10. The aircraft controller of claim 9, wherein the electronic controller further includes a shared memory unit in signal communication with the at least one control core and the at least one prognostics core.

11. The aircraft controller of claim 10, wherein the at least one control core is configured to store operating data obtained during operation of the electrical system in the shared memory unit, and the at least one prognostics core is configured to obtain the operating data from the shared memory unit, and process and analyze the operating data to perform maintenance and health predictions of the electrical system.

12. The aircraft controller of claim 9, wherein the at least one prognostics core performs the processing and analysis of the prognostics and diagnostics data during in-flight operation of the aircraft.

13. The aircraft controller of claim 9, further comprising a main processor in signal communication with the multi-core processor, the main processor configured to perform at least one of an aircraft flight protection operation, an aircraft mode control operation and a diagnostics communications operation based on the process and analyze prognostics and diagnostics data generated by the prognostics core.

14. A method of controlling an electrical system installed in an aircraft, the method comprising:

outputting, via at least one control core included in a multi-core processor, power signals to operate the electrical system;

returning operating data from the electrical system to the at least one control core;

processing, via a prognostics core included in the multi-core processor, the operating data independently from operation of the control core; and generating prognostics and diagnostics data of the electrical system based on the operating data independently from operation of the control core; and assigning a first priority to the operation of outputting, via at least one control core, the power signals to operate the electrical system that is a higher priority than a second priority assigned to the operation of processing the operating data, via the prognostics core, such that the at least one core processor is configured to enable and disable, while the prognostics core is prevented from interrupting one or both of the at least one control core and the main processor.

15. The method of claim 14, further comprising partitioning the at least one prognostics core from the at least one control core.

16. The method of claim 15, further comprising processing the operating data without using processing cycles of the control core.

17. The method of claim 16, further comprising:

storing, via the at least one control core is configured, the operating data obtained during operation of the electrical system in a shared memory unit;

obtaining, via the at least one prognostics core, the operating data from the shared memory unit, and process; and processing the operating data to generate the prognostics and diagnostics data of the electrical system.

18. The method of claim 16, further comprising processing, via the at least one prognostics core, the operating data during in-flight operation of the aircraft.

19. The method of claim 14, further comprising controlling at least one motor included in the electrical system based on the power signals.

20. The method of claim 14, further comprising controlling at least one of a power distribution system and a power generator system based on the power signals.

* * * * *